(12) United States Patent
Walker

(10) Patent No.: US 11,829,636 B2
(45) Date of Patent: Nov. 28, 2023

(54) COLD DATA IDENTIFICATION

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 65 days.

(21) Appl. No.: 17/464,490

(22) Filed: Sep. 1, 2021

(65) Prior Publication Data

US 2023/0068529 A1    Mar. 2, 2023

(51) Int. Cl.
*G06F 3/06*    (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20;
(Continued)

(56) References Cited

U.S. PATENT DOCUMENTS 4,571,674 A * 2/1986 Hartung ................ G06F 12/123
                                                            711/138
5,875,464 A * 2/1999 Kirk .................... G06F 12/0842
                                                          711/E12.039
(Continued)

FOREIGN PATENT DOCUMENTS

| CN | 107368436   |    | 11/2017  |              |
|----|-------------|----|----------|--------------|
| CN | 107368436 A | *  | 11/2017  | G06F 12/0871 |
| CN | 108062278   |    | 5/2018   |              |

OTHER PUBLICATIONS

Machine translation of CN107368436A; Google Patents; retrieved from https://patents.google.com/patent/CN107368436A/zh?oq=CN107368436 on Dec. 30, 2022 (Year: 2022).*
(Continued)

*Primary Examiner* — Daniel C. Chappell
(74) *Attorney, Agent, or Firm* — Brooks, Cameron & Huebsch, PLLC

(57) ABSTRACT

A method comprising directing, via a memory manager, an address associated with data to be written to a cold memory map, receiving the data at a memory device, and writing the data to the memory device in response to the memory manager identifying the data as cold data in response to writing the address associated with the data to the cold memory map.

20 Claims, 4 Drawing Sheets

(58) Field of Classification Search
CPC ........ G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 8,700,841 B2* | 4/2014 | Doatmas | G06F 3/0655 711/102 |
| 9,158,468 B2* | 10/2015 | Baldwin | G06F 3/064 |
| 9,158,671 B2* | 10/2015 | Ryu | G06F 3/0649 |
| 9,262,316 B2* | 2/2016 | Fisher | G06F 12/0246 |
| 9,280,478 B2* | 3/2016 | Sampathkumar | G06F 11/1435 |
| 9,342,389 B2* | 5/2016 | Tang | G06F 3/064 |
| 9,703,505 B2* | 7/2017 | Boyle | G06F 3/065 |
| 9,798,673 B2 | 10/2017 | Peterson et al. | |
| 10,733,107 B2* | 8/2020 | Tai | G06F 3/064 |
| 11,074,175 B1 | 7/2021 | Kuzmin et al. | |
| 2002/0083271 A1* | 6/2002 | Mounes-Toussi | G06F 12/0808 711/138 |
| 2005/0172082 A1* | 8/2005 | Liu | G06F 12/127 711/3 |
| 2008/0059707 A1* | 3/2008 | Makineni | G06F 12/0897 711/122 |
| 2009/0164736 A1* | 6/2009 | Dorsey | G06F 12/128 711/141 |
| 2013/0311724 A1* | 11/2013 | Walker | G06F 12/0811 711/E12.071 |
| 2014/0143493 A1* | 5/2014 | Loh | G06F 12/0897 711/122 |
| 2015/0324296 A1 | 11/2015 | Cui et al. | |
| 2015/0347310 A1* | 12/2015 | Ish | G06F 3/0679 711/3 |
| 2019/0073305 A1* | 3/2019 | Hijaz | G06F 12/0848 |

OTHER PUBLICATIONS

Y.-J. Woo, S. Lee and S. L. Min, "FMMU: A Hardware-Accelerated Flash Map Management Unit for Scalable Performance of Flash-Based SSDs," 2018 55th ACM/ESDA/IEEE Design Automation Conference (DAC), San Francisco, CA, USA, 2018, pp. 1-6, doi: 10.1109/DAC.2018.8465808. (Year: 2018).*

Y. Song, S. Fan, J. Xu and J. Liao, "A Novel Hot-cold Data Identification Mechanism Based on Multidimensional Data," 2022 5th International Conference on Data Science and Information Technology (DSIT), Shanghai, China, 2022, pp. 1-5, doi: 10.1109/DSIT55514.2022.9943890. (Year: 2022).*

Y. Wang, J. Zhao, Q. Zhou, X. Xiong, H. Zhang and C. Chen, "Identification of Hot data and Caching strategy for Industrial Big Data Based on Temperature Model," 2023 IEEE International Conference on Big Data and Smart Computing (BigComp), Jeju, Korea, Republic of, 2023, pp. 289-290 (Year: 2023).*

D. Park and D. H. C. Du, "Hot data identification for flash-based storage systems using multiple bloom filters," 2011 IEEE 27th Symposium on Mass Storage Systems and Technologies (MSST), Denver, CO, USA, 2011, pp. 1-11, doi: 10.1109/MSST.2011.5937216. (Year: 2011).*

* cited by examiner

COLD DATA IDENTIFICATION

TECHNICAL FIELD

Embodiments of the disclosure relate generally to identifying cold data, and more specifically, relate to identifying cold data using a cold memory map and/or a register.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to identifying cold data in memory, in particular to memory sub-systems that include a memory sub-system cold memory map and/or register. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system (e.g., a host) can utilize a memory sub-system that includes one or more components, such as memory devices that store data. The host system can provide data to be stored at the memory sub-system and can request data to be retrieved from the memory sub-system.

Many memory systems include a buffer to perform buffering, prefetching, or caching operations on non-volatile memory and volatile memory, for example, a DRAM to cache hot pages to improve the performance of the memory system. A problem can occur when evicting a page from the volatile memory to the non-volatile memory. The data can be read from the volatile memory and written to the non-volatile memory where the data is buffered prior to being written to the non-volatile memory. The non-volatile memory is unable to differentiate between write commands associated with page evictions from the volatile memory and write commands from a host. Accordingly, a non-volatile memory cannot prioritize write commands from a host over page evictions.

Aspects of the present disclosure address the above and other deficiencies by providing a cold memory map and/or a register to allow the non-volatile memory to distinguish between host data and cold data (e.g., evicted data). For example, a first memory device can evict data, a memory manager can direct an address associated with the evicted data to be written to a cold memory map, and a second memory device can receive the evicted data from the first memory device and write the evicted data to the second memory device in response to the memory manager identifying the evicted data as cold data in response to writing the address associated with the evicted data to the cold memory map.

Figure 1:
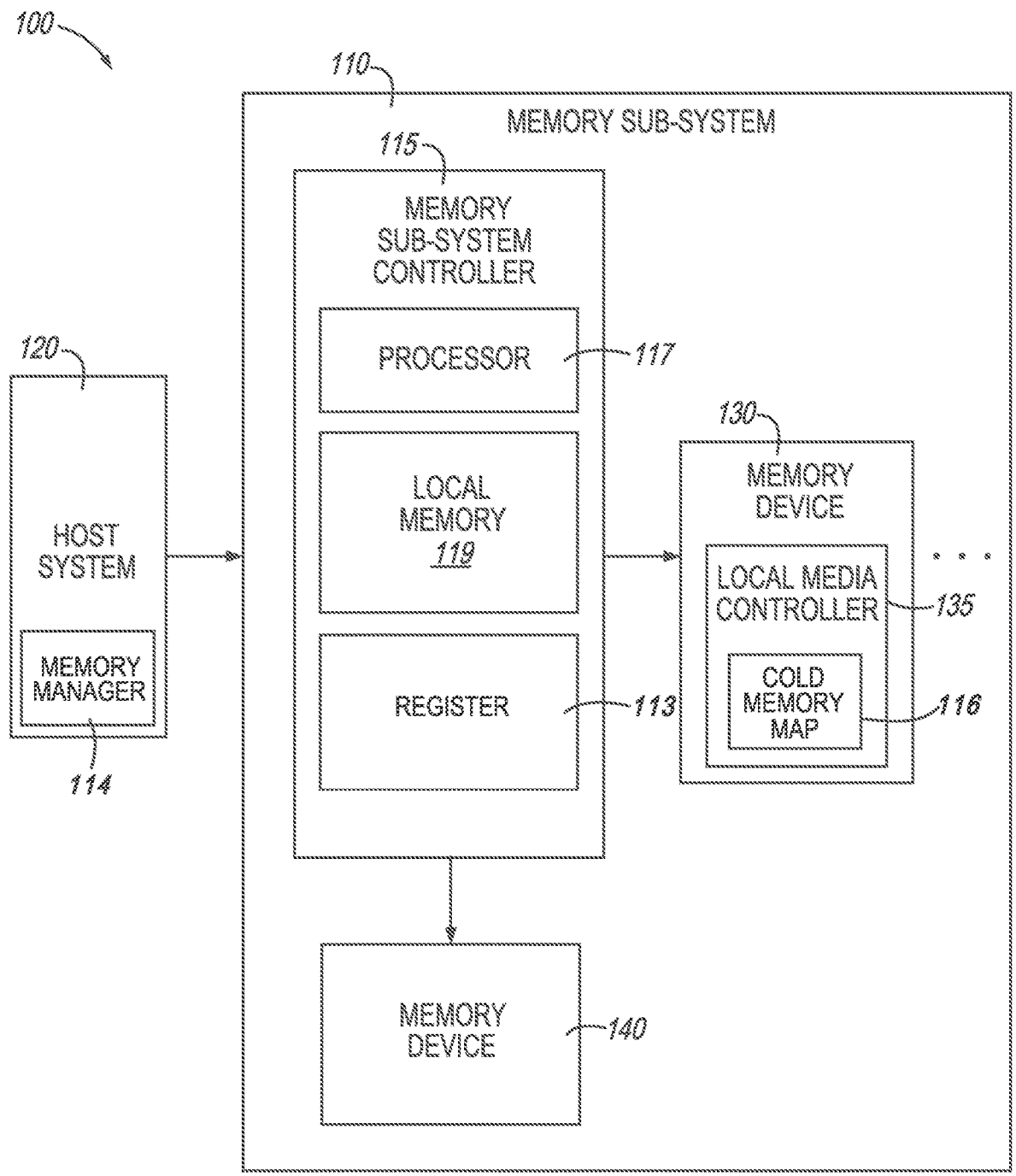
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a compute express link (CXL) attached memory module, a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a memory manager 114, a processor chipset, and/or a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a CXL interface, a serial advanced technology attachment (SATA)

interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. The local media controller 135 can include a cold memory map 116. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include register 113. Although not shown in FIG. 1 so as to not obfuscate the drawings, the register 113 can include various circuitry to facilitate performance of identifying cold data, as described herein. In some embodiments, the register 113 can include special purpose circuitry in the form of an ASIC, FPGA, state machine, and/or other logic circuitry that can allow the register 113 to orchestrate and/or perform operations described herein involving the memory device 130 and/or the memory device 140.

In some embodiments, the memory sub-system controller 115 includes at least a portion of the register 113. For example, the memory sub-system controller 115 can include a processor 117 (processing device) configured to execute instructions stored in local memory 119 for performing the operations described herein. In some embodiments, the register 113 are part of the host system 120, an application, or an operating system.

In a non-limiting example, an apparatus (e.g., the computing system 100) can include the register 113. The register 113 can be resident on the memory sub-system 110. As used herein, the term "resident on" refers to something that is physically located on a particular component. For example, the register 113 being "resident on" the memory sub-system 110 refers to a condition in which the hardware circuitry that comprises the register 113 are physically located on the memory sub-system 110. The term "resident on" can be used interchangeably with other terms such as "deployed on" or "located on," herein.

Figure 2:
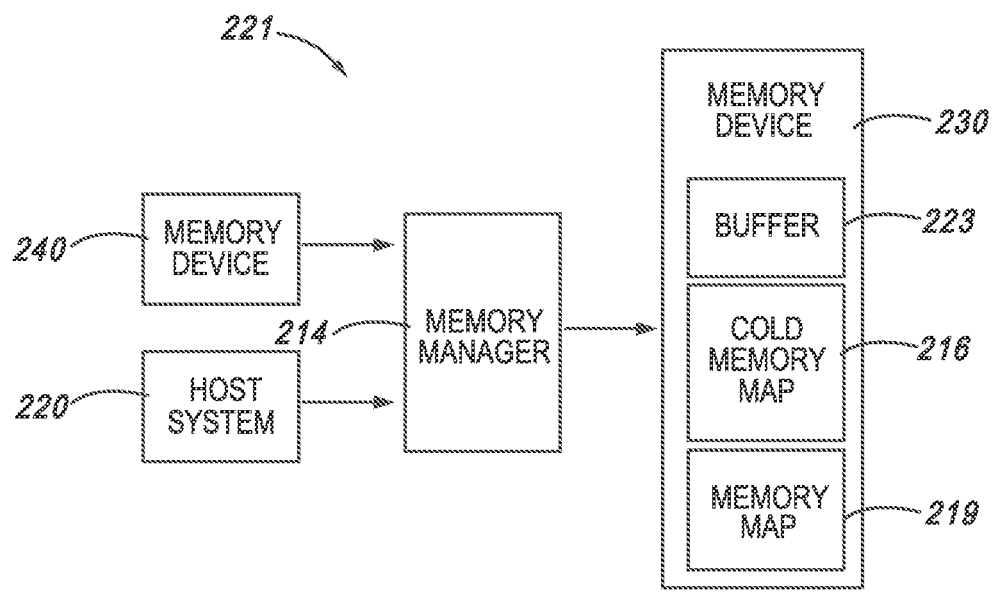
FIG. 2 illustrates a flow diagram corresponding to identifying cold data using a cold memory map in accordance with some embodiments of the present disclosure.

FIG. 2 illustrates a flow diagram 221 corresponding to identifying cold data using a cold memory map 216 in accordance with some embodiments of the present disclosure. Memory device 240, host system 220, memory manager 214, memory device 230, and cold memory map 216 can correspond to memory device 140, host system 120, memory manager 114, memory device 130, and cold memory map 116, respectively of FIG. 1. The memory manager 214 can include hardware, software, and/or firmware that is configured to enable the memory manager to determine whether data is transmitted to the cold memory map 216 or memory map 219.

The memory manager 214 can direct an address associated with data from a memory device 240 and/or host system 220 to be written to the cold memory map and/or the memory map 219 of memory device 230. If the data is from memory device 240, the memory manager 214 can determine the data is data being evicted from the memory device 240. The memory device 240 evicts data when the data is no longer being used frequently, which means the data is cold data. Accordingly, the memory manager 214 identifies the data from memory device 240 as cold data and directs the address associated with the data to be transmitted and/or written to the cold memory map 216.

In response to writing the address associated with the data to the cold memory map 216, the memory device 230 can identify the data as cold data. As such, the memory device 230 can write the data to the least recently used (LRU) list of the buffer 223 on memory device 230. The memory device 230 can quickly write the data and remove it from the buffer 223 to free up the buffer 223 for hot data in response to the data being added to the LRU list of the buffer 223. In some examples, data associated with the address written to the cold memory map 216 can bypass the buffer 223 and be written to the memory device 230 (e.g., a backing store).

When cold data is evicted from the memory device 240 and moved to memory device 230, kernel routines and hardware can be used to invalidate caches, to perform a remapping of the virtual address of the cold data to a new physical address, and the cold data can be moved. Once the cold data is moved to memory device 230, the operating system can be instructed to perform a page table update by, for example, the memory manager 214. In some embodiments, the memory manager 214 can instruct the operating system to perform the page table update in response to the cold memory map 216 syncing with memory map 219. The physical address that was assigned for the eviction can be mapped to the cold memory map 216. Once the cold data is transmitted to memory device 230, a second virtual to physical mapping can be performed so that memory map 219 can be used when the host wants to access the cold data. For example, the memory manager 214 can sync the cold memory map 216 and the memory map 219 in response to the data being written to the second memory device. As such, the cold memory map 216 and the memory map 219 can stay synchronized so that memory device 230 can receive a read request for the data from the first memory device and access the data using memory map 219.

If the data is from host system 220, the memory manager 214 can determine the data is associated with a host command. Accordingly, the memory manager 214 identifies the data from host system 220 as a priority and directs the address associated with the data to be transmitted to the memory map 219.

In response to the memory device 230 receiving the address associated with the data via the memory map 219, the memory device 230 can prioritize the data. For example, the memory device 230 can prioritize the data from the host system 220 over the data from memory device 240. As such, the memory device 230 can write the data to the most recently used (MRU) list of the buffer 223 on memory device 230. The memory device 230 can keep the data on the buffer 223 longer to be able to access the data quicker in response to the data being added to the MRU list of buffer 223.

Figure 3:
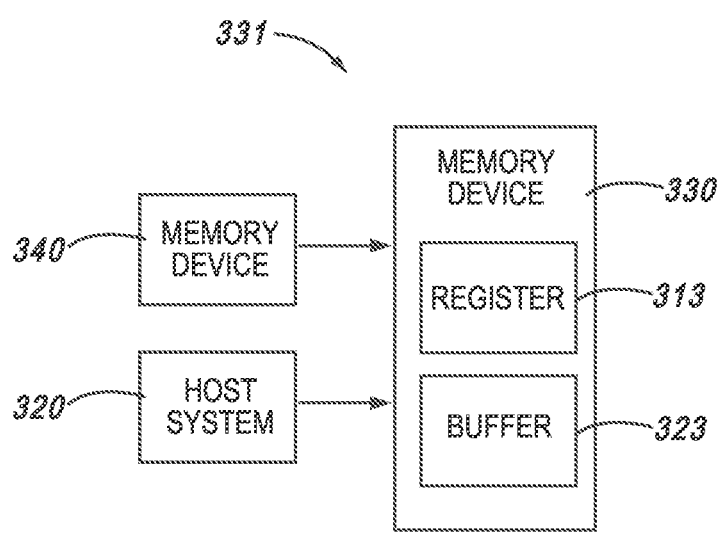
FIG. 3 illustrates a flow diagram corresponding to identifying cold data using a register in accordance with some embodiments of the present disclosure.

FIG. 3 illustrates a flow diagram 331 corresponding to identifying cold data using a register 313 in accordance with some embodiments of the present disclosure. Memory device 340, host system 320, memory device 330, and register 313 can correspond to memory device 140, host system 120, memory device 130, and register 113 of FIG. 1.

The register 313 can include hardware, software, and/or firmware that is configured to enable the register 313 to be programmed to indicate data being evicted from memory device 340. For example, memory device 340 can transmit an address of data being evicted to the register 313 on memory device 330 and memory device 330 can program the register 313 with the address of the data that is being evicted.

Memory device 340 can evict the data by transmitting the data to memory device 330 prior to erasing the data. As memory device 330 receives data, the memory device 330 can compare the address of the received data to the address in register 313. If the address of the received data matches the address in the register 313, memory device 330 can determine the data is cold data. Then the memory device 330 can write the received data to the LRU list of a buffer 323 on memory device 330. In some examples, the cold data can bypass the buffer 323 and be written directly to memory device 330.

If the address does not match the address in the register, memory device 330 can determine the data is from the host system. Then the memory device 330 can write the data to the MRU list of the buffer 323 on memory device 330. Accordingly, the memory device 330 can identify and prioritize data from the host system 320 over cold data from memory device 340. For example, memory device 330 can write portions of data in the buffer from the LRU list to the memory device 330 before portions of data in the buffer from the MRU list.

Figure 4:
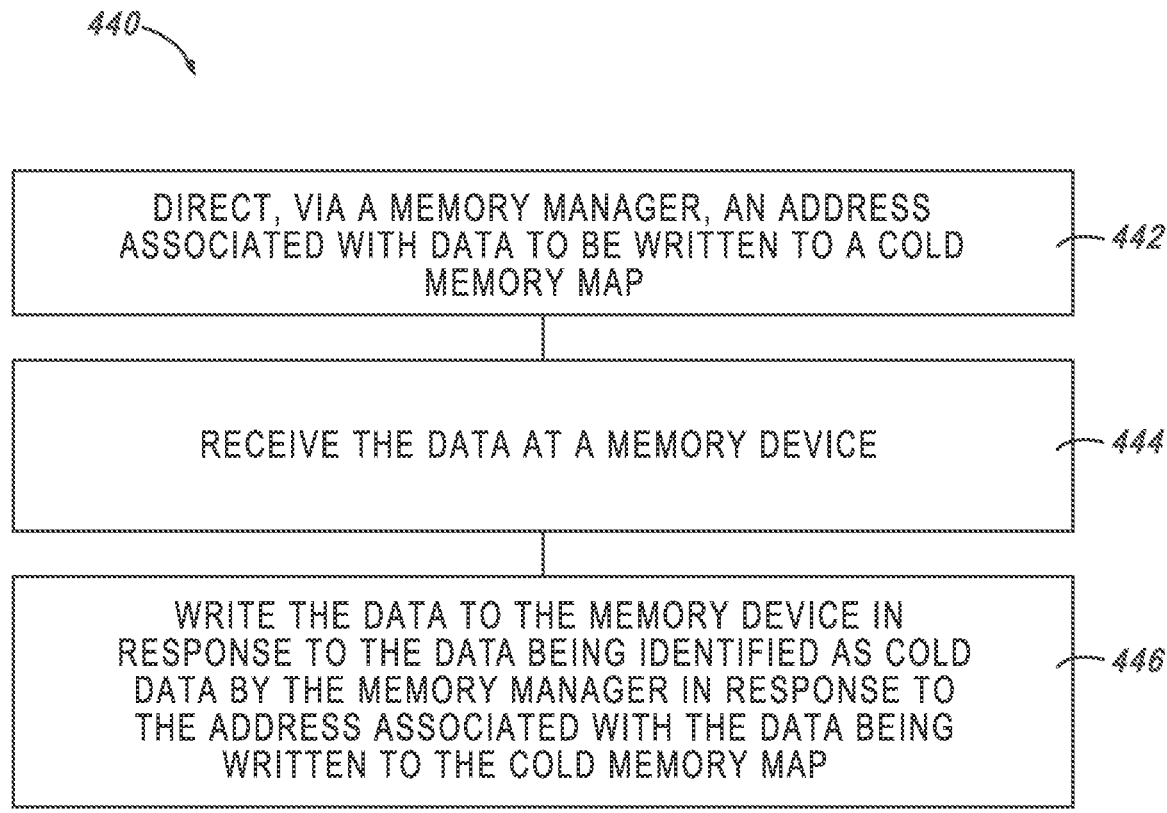
FIG. 4 is a flow diagram of a method associated with identifying cold data in accordance with some embodiments of the present disclosure.

FIG. 4 is a flow diagram of a method 440 associated with identifying cold data in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the memory device 130 of FIG. 1 and/or the memory device 230 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, an address associated with data can be directed, via a memory manager (e.g., memory manager 114 in FIG. 1.), to be written to a cold memory map. The memory manager can direct the address associated with the data to be written to the cold memory map in response to the data being from a different memory device (e.g., memory device 140 in FIG. 1). The different memory device can be a host memory, for example. The data can be determined to be evicted data and/or data from a different memory device in response to the address associated with the data directed to be written to the cold memory map by the memory manager.

At operation 444, the data can be received at a memory device. The memory device can be a CXL attached memory, for example. The data can be determined not to be data from a host system (e.g., host system 120 in FIG. 1) in response to the address associated with the data directed to be written to the cold memory map by the memory manager. In some embodiments, the memory manager can direct the address associated with the data to be directed to a different memory map in response to the data being from the host system. Accordingly, the data could be determined to be data from the host system in response to the address associated with the data directed to be written to the different memory map.

At operation 446, the data can be written to the memory device in response to the data being identified as cold data by the memory manager in response to the address associated with the data being written to the cold memory map. The memory device can write the data to the LRU list of a buffer on the memory device in response to writing the address associated with the data to the cold memory map. The memory device can write the data to the MRU list of the buffer on the memory device in response to writing the address associated with the data to the different memory map. Data written to the MRU list can be prioritized over data written to the LRU list.

Figure 5:
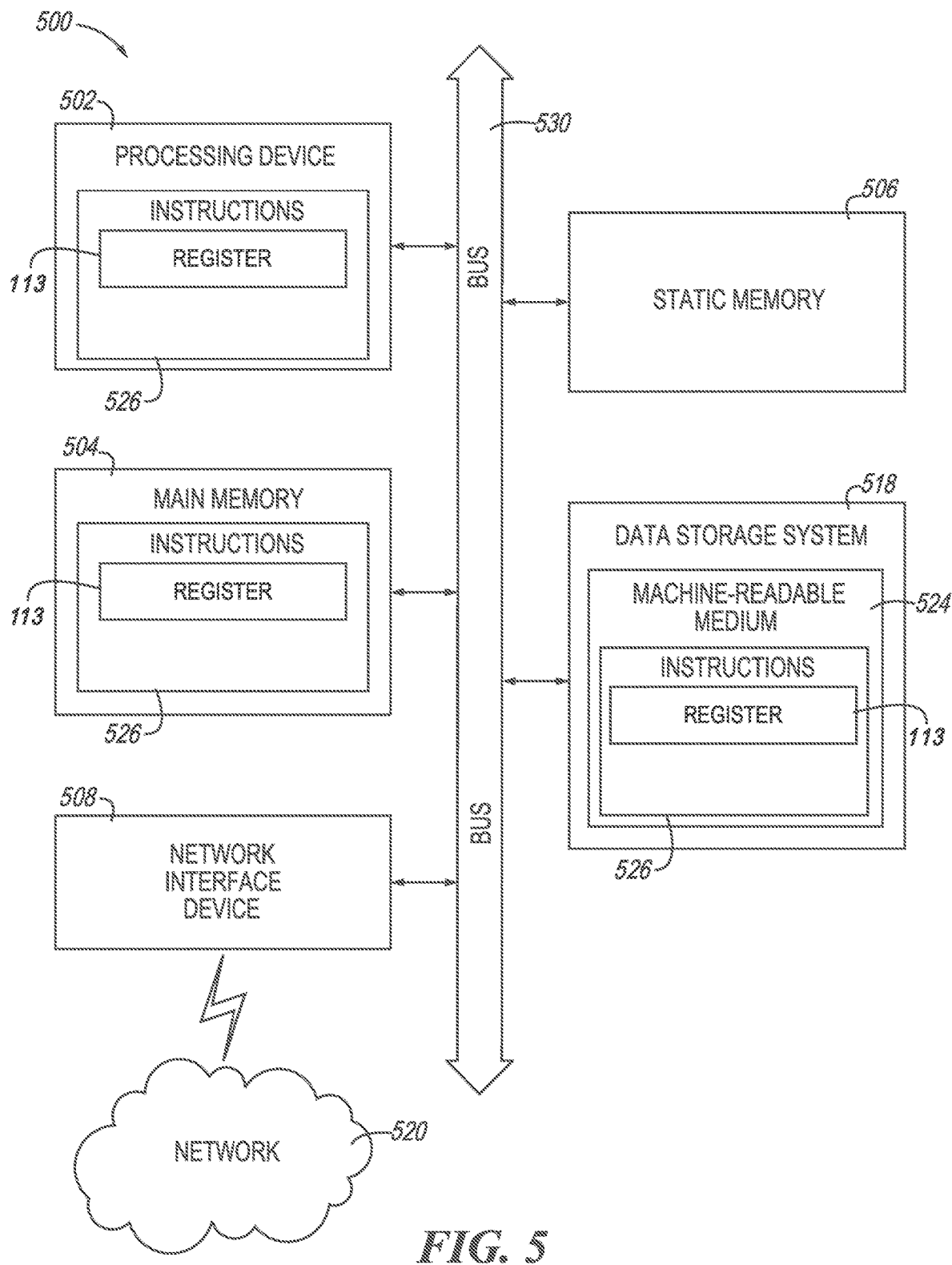
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the register 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a register (e.g., the register 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    directing, via a memory manager, an address, associated with a first portion of data to be written to a memory device, to a cold memory map;
    directing, via the memory manager, a different address, associated with a second portion of data to be written to the memory device, to a different memory map;
    receiving the first portion of data and the second portion of data at the memory device; and
    writing the first portion of data to the memory device prior to writing the second portion of data to the memory device in response to the memory manager identifying the first portion of data as cold data in response to writing the address associated with the first portion of data to the cold memory map and writing the different address associated with the second portion of data to the different memory map.

2. The method of claim 1, further comprising determining the first portion of data is from a different memory device in response to the memory manager directing the address, associated with the first portion of data to be written to the memory device, to the cold memory map.

3. The method of claim 1, further comprising determining the first portion of data is evicted data in response to the memory manager directing the address, associated with the first portion of data to be written to the memory device, to the cold memory map.

4. The method of claim 1, further comprising determining the first portion of data is not from a host in response to the memory manager directing the address, associated with the first portion of data to be written to the memory device, to the cold memory map.

5. An apparatus, comprising:
a first memory device configured to evict a first portion of data from the first memory device;
a memory manager configured to:
  direct an address, associated with the evicted first portion of data to be written to a second memory device, to a cold memory map; and
  direct a different address, associated with a second portion of data to be written to the second memory device, to a different memory map; and
the second memory device configured to:
  receive the evicted first portion of data from the first memory device and the second portion of data; and
  write the evicted first portion of data from the first memory device to the second memory device prior to writing the second portion of data to the second memory device in response to the memory manager identifying the evicted first portion of data as cold data in response to writing the address, associated with the evicted first portion of data, to the cold memory map and writing the different address, associated with the second portion of data, to the different memory map.

6. The apparatus of claim 5, wherein the memory manager is configured to sync the cold memory map with the different memory map.

7. The apparatus of claim 6, wherein the memory manager is configured to sync the cold memory map with the different memory map in response to the first portion of data being written to the second memory device.

8. The apparatus of claim 6, wherein the memory manager is configured to instruct an operating system to perform a page table update in response to the cold memory map syncing with the different memory map.

9. The apparatus of claim 6, wherein the second memory device is configured to:
receive a read request for the first portion of data from the first memory device; and
access the first portion of data from the second memory device using the different memory map.

10. The apparatus of claim 6, wherein the second memory device is configured to receive both a second portion of data and addresses included in the different memory map from a host.

11. The apparatus of claim 10, wherein the second memory device assigns a higher priority value to the second portion of data from the host than a priority value assigned to the first portion of data from the first memory device.

12. The apparatus of claim 10, wherein the second memory device comprises a buffer.

13. The apparatus of claim 12, wherein the second memory device is configured to write the second portion of data from the host to a most recently used (MRU) list of the buffer in response to receiving both the second portion of data and the addresses included in the different memory map.

14. The apparatus of claim 12, wherein the second memory device is configured to write the first portion of data from the first memory device to a least recently used (LRU) list of the buffer in response to writing the address associated with the first portion of data to the cold memory map.

15. An apparatus, comprising:
a first memory device configured to:
  write a first address associated with a first portion of data to a register on the first memory device;
  receive a second portion of data including a second address; and
  compare the second address to the first address in the register, wherein the second portion of data is determined to be cold data in response to the second address matching the first address and the second portion of data is determined to be from a host in response to the second address and the first address being different.

16. The apparatus of claim 15, wherein the first memory device comprises a buffer.

17. The apparatus of claim 16, wherein the first memory device is configured to write the second portion of data to a least recently used (LRU) list of the buffer of the first memory device in response to the second address matching the first address in the register.

18. The apparatus of claim 16, wherein the first memory device is configured to write the second portion of data to a most recently used (MRU) list of the buffer of the first memory device in response to the second address being different than the first address in the register.

19. The apparatus of claim 15, wherein the second portion of data was evicted from a second memory device.

20. The apparatus of claim 15, wherein the second memory device is configured to write portions of data in the buffer from a least recently used (LRU) list to the second memory device before portions of data in the buffer from a most recently used (MRU) list.

* * * * *